March 27, 1945.     J. F. HYLAND     2,372,275
GARDEN IMPLEMENT
Filed Sept. 20, 1943
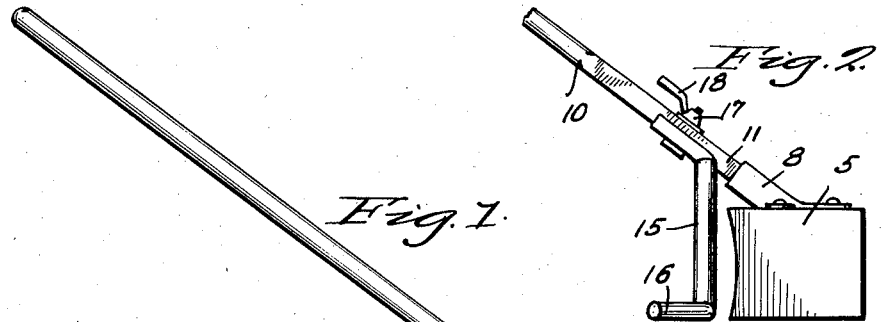
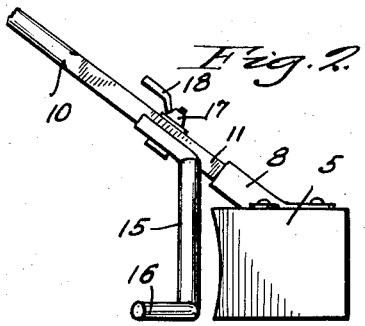
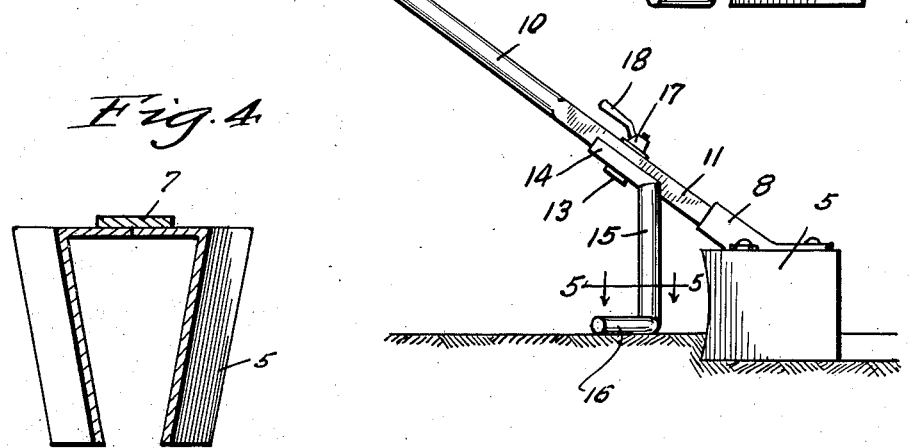
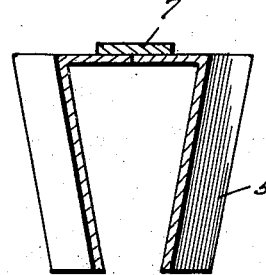
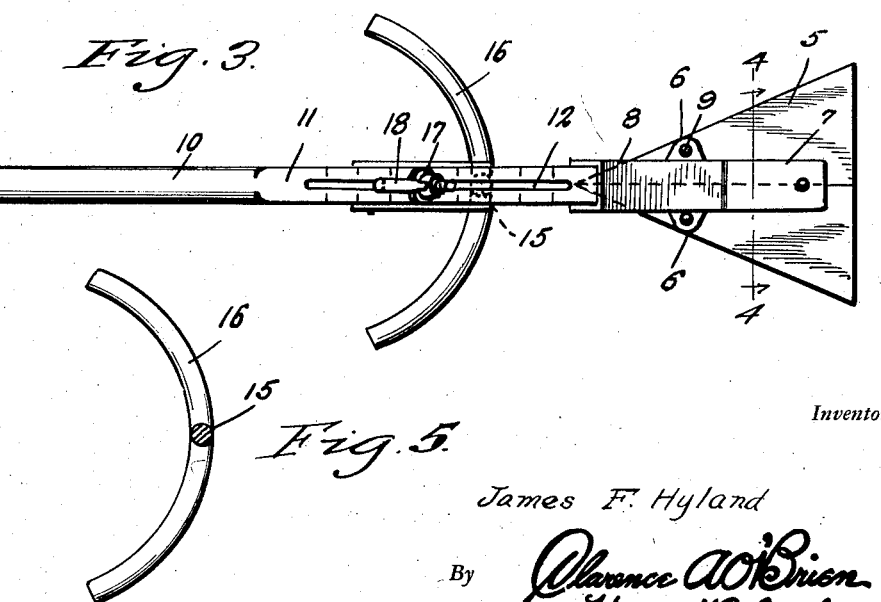
Inventor
James F. Hyland

UNITED STATES PATENT OFFICE 2,372,275

GARDEN IMPLEMENT

James F. Hyland, Champaign, Ill.

Application September 20, 1943, Serial No. 503,128

3 Claims. (Cl. 97—58)

This invention relates to new and useful improvements in garden implements and more particularly to a planting plow for producing furrows to a depth most efficient for the proper growth of plants.

The principal object of the present invention is to provide a simple garden implement which can be readily adjusted to regulate the depths at which furrows are made.

Other objects and advantages of the invention will become apparent to the reader of the following description.

In the drawing:

Figure 1 represents a side elevational view of the implement with the gauge in one position.

Figure 2 is a fragmentary side elevational view with the gauge adjusted to another position.

Figure 3 is a fragmentary top plan view.

Figure 4 is a cross section on the line 4—4 of Figure 3.

Figure 5 is a section taken on the line 5—5 of Figure 1.

Referring to the drawing, wherein like numerals designate like parts, it can be seen that numeral 5 denotes a triangular-shaped plow, preferably constructed in a pair of sections which are held together by the ears 6 and extension 7 of a socket 8 in conjunction with certain securing elements 9. It will be noted that the plow embodies a triangular top plate member having depending downwardly converging plate-like side members on the opposite forwardly converging side edges thereof.

Numeral 10 denotes an elongated handle having a square end portion 11 disposed into the socket 8 and this squared portion 11 is slotted as at 12 to receive a bolt 13, which is disposed through the channeled inclined portion 14 of a leg 15, and which at its lower end is provided with an arcuate ground engaging guide 16.

The bolt 13 extends upwardly through the opening 12 and is provided with a nut 17 having a handle 18 projecting laterally therefrom. It is preferable to have the top portion of the handle 10 at the portion 11 thereof marked off in inches or some other measurement.

Obviously, by adjusting the gauge up or down on the handle 10, the depth of the plow 5 will be precisely regulated.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A garden tool comprising a plow, a handle extending from the plow, a depth gauge depending from the handle and adjusting means between the handle and the gauge, said adjusting means comprising a channeled offset at the upper portion of the depth gauge, said handle being slotted, a bolt disposed through the channeled offset and through the slot and a nut for the bolt.

2. A hand garden implement comprising a plow, said plow embodying a triangular top plate member having depending downwardly converging plate-like side members on the opposite forwardly converging side edges thereof, a forwardly and upwardly inclined socket fixed on said top plate member, an elongated forwardly and upwardly inclined handle having its lower end secured in said socket, and a ground engaging depth gauge disposed in front of the plow and adjustable longitudinally of the inclined handle to regulate the height thereof.

3. A hand garden implement comprising a plow having a forwardly and upwardly inclined elongated handle fixed thereto, the lower portion of said handle having a vertical longitudinal elongated slot, and an adjustable depth gauge including a ground engaging member or arcuate form in plan having a central rigid leg rising therefrom, said leg having a forwardly and upwardly inclined channeled upper end portion slidably fitting the slotted portion of the handle, and a nutted bolt passing through said channeled end portion and the slot of the handle.

JAMES F. HYLAND.